United States Patent [19]
Esashi et al.

[11] 3,921,927

[45] Nov. 25, 1975

[54] TAPE REEL

[75] Inventors: Hanjiro Esashi; Kiyosi Urayama, both of Sendai; Katsuyoshi Kawamata, Shiogama; Kokichi Sugawara, Shichigahama; Junichiro Tobe, Tagajo, all of Japan

[73] Assignee: Sony Corporation, Tokyo, Japan

[22] Filed: Aug. 20, 1974

[21] Appl. No.: 499,005

[30] Foreign Application Priority Data

Aug. 31, 1973 Japan .............................. 48-102493

[52] U.S. Cl. .................................................. 242/74

[51] Int. Cl. ........................................... B65h 75/28

[58] Field of Search ........... 242/74, 74.1, 71.8, 115, 242/116, 118.4, 71.8 A

[56] References Cited

UNITED STATES PATENTS

| | | | |
|---|---|---|---|
| 2,600,409 | 6/1952 | Lippert | 242/74 X |
| 2,974,892 | 3/1961 | Geloso | 239/265.39 |
| 3,497,050 | 2/1970 | Landgrof | 242/74 |

*Primary Examiner*—Edward J. McCarthy
*Attorney, Agent, or Firm*—Lewis H. Eslinger

[57] ABSTRACT

A dynamically balanced tape reel, for example, adapted to have magnetic tape wound thereon for use in a video or audio recording and/or reproducing apparatus, is composed of a molded plastic resin spool member having a circular flange and a generally cylindrical hub projecting axially from the flange and which includes first and second semi-cylindrical hub portions having the same inner radii and relatively large and small outer radii, respectively, a substantially semi-cylindrical tape-securing sector of molded plastic resin having outer and inner radii substantially equal to the outer radii of the first and second hub portions, respectively, so that, in an operative position of the aforementioned sector, the latter is closely engageable against the second hub portion for securing an end portion of a tape therebetween, and cooperatively engageable locking elements on the hub and tape-securing sector for holding the latter in its operative position and thereby permitting the smooth winding of the secured tape on the cylindrical surface constituted by the radially outer surfaces of the first hub portion and the tape-securing sector, respectively.

12 Claims, 7 Drawing Figures

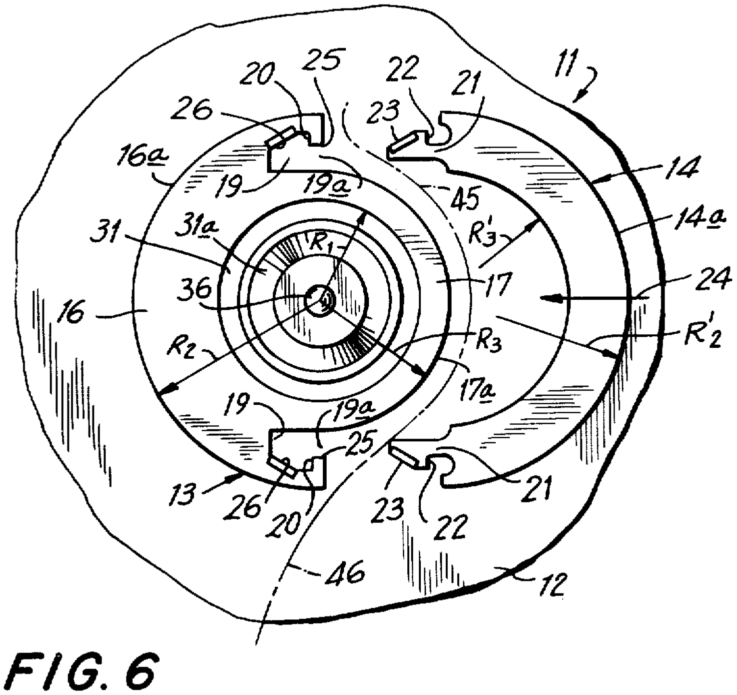
FIG. 6
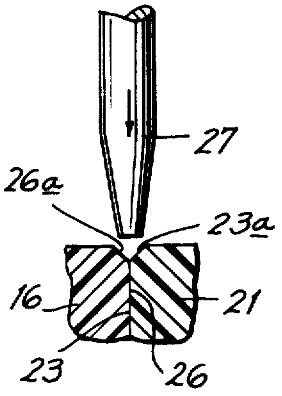
FIG. 7
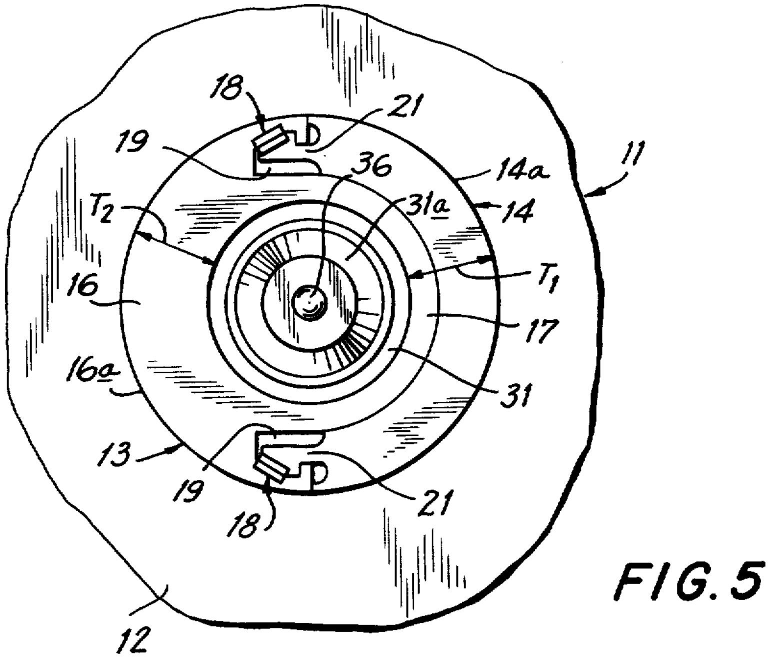

TAPE REEL

BACKGROUND OF THE INVENTION

1. Field of the Invention

This invention relates to an improved reel adapted to have magnetic tape or the like wound thereon, for example, for use in a video or audio recording and/or reproducing apparatus.

2. Description of the Prior Art

Tape reels, for example, adapted to have magnetic tape wound thereon for use in a video or audio recording and/or reproducing apparatus, usually have an end portion of the tape secured to the reel hub so that, upon the complete unwinding of the tape from the reel, the tape end portion will remain attached to the reel hub for rewinding of the tape on the reel in response to reverse rotation of the latter. Such attachment of the tape end portion to the reel hub is particularly necessary when the reel is contained in a cassette housing or magazine and thus is not readily accessible for the reattachment of the tape to the reel in the event that the tape is separated therefrom.

In existing tape reels of the described type, the hub of the reel, which is preferably molded of a plastic resin, is formed with a recess extending axially in the cylindrical hub surface and having undercut opposed sides to receive a locking bar or wedge of similar cross-section by which a tape end portion can be clamped in such recess. In actual practice, the outer surface of the locking bar or wedge, when engaged in the recess for clamping a tape end portion therein, may project radially beyond, or be radially recessed from the remaining cylindrical hub surface, with the result that the turns of the tape wound on the hub will be non-circular. By reason of such non-circular turns of the tape wound on the reel, the latter is dynamically unbalanced in rotation and so-called wow or flutter may occur in the signals recorded or reproduced on the tape. Further when the locking bar or wedge is intended to be snapped radially into the respective recess and the wedge and recess are of relatively small circumferential extent, as in the above described existing tape reels, the relative dimensions of the wedge and recess become critical for permitting their snapping interengagement, and difficulty is experienced in installing the wedge in the respective recess for clamping or securing the tape end portion to the reel. The described arrangement is also disadvantageous in that extreme care has to be exercised to ensure that the longitudinal axis of the tape will be parallel to the planes of the reel flanges when clamping the tape end portion to the reel hub and, if such parallelism is not achieved at the time of initial assembly, the wedge cannot be easily removed from its recess for re-engagement of the tape end portion with the reel hub.

It has also been proposed, particularly in the case of spools for typewriter ink ribbons, to provide the hub of a molded plastic spool with an arcuate circumferential recess into which the end of an inked ribbon may be projected, and with an arcuate door-like element which is integrally hinged, as by a thin plastic web at one end, to an end of the recess so that the door-like element can be pivoted between a radial or open position and a circumferential closed position where the free end of the door-like element is interengaged with an adjacent undercut end of the recess for clamping the ribbon between such interengaged ends. However, in the closed position of the door-like element, the latter is substantially spaced from the radially inward surface of the recess so that the ribbon is only clamped between the interengaged ends of the door-like element and recess, as aforesaid, and the unfilled portion of the recess constitutes an eccentric cavity within the spool which would result in undesirable dynamic unbalance if the described arrangement was applied to a tape reel apt to be rotated at relatively high speeds.

SUMMARY OF THE INVENTION

Accordingly, it is an object of the invention to provide a tape reel, for example, adapted to have magnetic tape wound thereon for use in a video or audio recording and/or reproducing apparatus, and which is provided with an improved arrangement for clamping an end portion of the tape to the reel hub without adversely affecting the dynamic balance of the reel.

Another object is to provide a tape reel, as aforesaid, which facilitates the clamping or attachment of a tape end portion to the reel hub.

A further object is to provide a tape reel, as aforesaid, which affords imcreased security to the clamping or attachment of the tape end portion to the reel hub, and which ensures the proper alignment of the tape in respect to the reel hub.

Still another object is to provide a tape reel, as aforesaid, which facilitates the release and reattachment of the tape end portion in respect to the reel hub.

In accordance with an aspect of the invention, a tape reel comprises a molded plastic resin spool member including a generally circular flange, and a generally cylindrical hub extending axially from said flange concentric with the latter and including first and second substantially semi-cylindrical portions having the same inner radii and relatively large and small outer radii, respectively, so as to provide the first and second hub portions with relatively large and small radial thicknesses, respectively, and a substantially semi-cylindrical tape-securing sector of molded plastic resin having outer and inner radii substantially equal to the outer radii of the first and second hub portions, respectively, so that, in an operative position of such sector, the latter is closely engageable against the radially outer surface of the second hub portion for securing a tape end portion therebetween and to provide, with the second hub portion, a total radial thickness substantially equal to the relatively large radial thickness of the first hub portion. Further, cooperatively engageable locking means are provided on the hub and sector for holding the latter in its operative position and thereby permitting the smooth winding of a secured tape on a cylindrical surface constituted by the radially outer surfaces of the first hub portion and the sector, respectively.

In a particularly desirable embodiment of the above tape reel according to the invention, the first hub portion has undercut opposite end portions defining respective recesses opening circumferentially toward the second hub portion and having shoulders therein facing away from such second hub portion and defining the locking means on the hub, while the locking means on the tape-securing sector includes resilient extensions projecting tangentially from the opposite ends of such sector and having shoulders which are engageable with the shoulders in the respective recesses when the tape-securing sector is in its operative position.

The above, and other objects, features and advantages of the invention, will be apparent in the following detailed description of an illustrative embodiment thereof which is to be read in connection with the accompanying drawings.

BRIEF DESCRIPTION OF THE DRAWINGS

FIG. 5 is a fragmentary enlarged top plan view of the tape reel of FIG. 1, but shown with a flange member thereof removed;

FIG. 6 is a view similar to that a FIG. 5, but showing a tape-securing element or sector separated from the remainder of the hub for permitting the attachment to the latter of a tape end portion which is shown in broken lines; and FIG. 7 is an enlarged, fragmentary sectional view taken along the line 7—7 on FIG. 4.

DETAILED DESCRIPTION OF A PREFERRED EMBODIMENT

Figure 1:
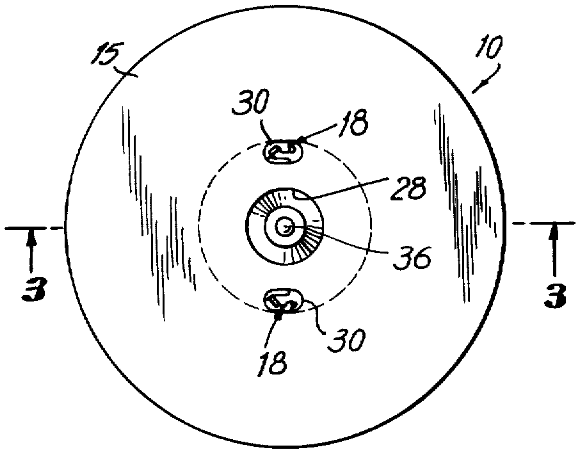
FIG. 1 is a top plan view of a tape reel according to an embodiment of this invention.
Figure 3:
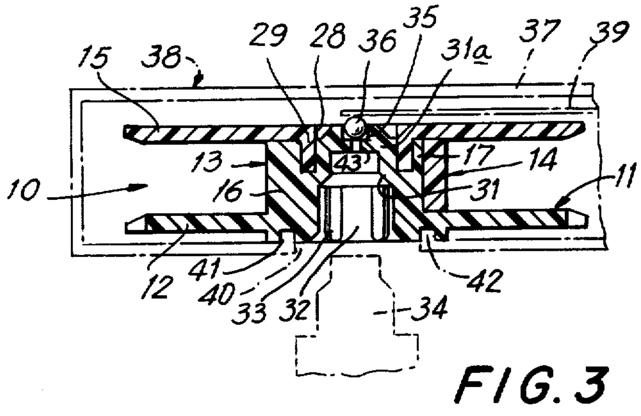
FIG. 3 is a sectional view taken along the line 3—3 on FIG. 1, and showing the reel associated with a portion of a cassette housing and a reel drive shaft which are illustrated in broken lines.
Figure 2:
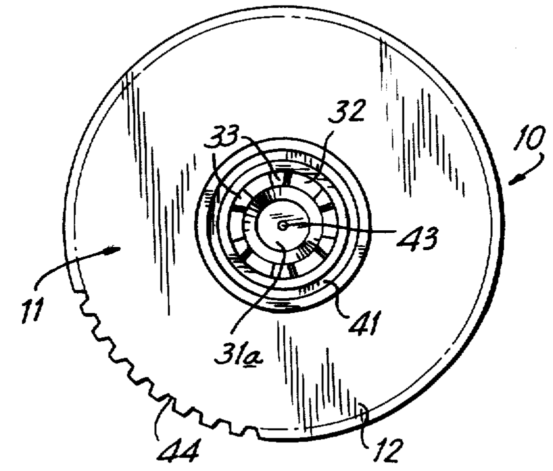
FIG. 2 is a bottom plan view of the tape reel of FIG. 1.

Referring to the drawings in detail, and initially to FIGS. 1–3 thereof, it will be seen that a dynamically balanced tape reel 10 according to this invention, for example, adapted to have magnetic tape wound thereon for use in video or audio recording and/or reproducing apparatus, generally comprises a molded plastic resin spool member 11 including a generally circular flange 12 and a generally cylindrical hub 13 extending axially from flange 12 and being concentric with the latter, a tape-securing element 14 which is adapted to be mounted on hub 13, as hereinafter described in detail, for securing an end portion of a tape of the hub, and a flange member 15 which is secured to spool member 11 so that a tape wound about hub 13 and element 14 is guided between flange 12 and flange member 15.

Figure 4:
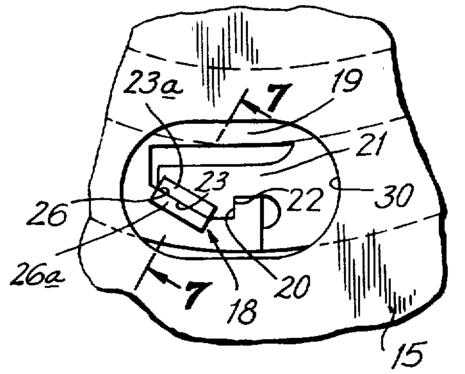
FIG. 4 is an enlarged detail view of a portion of FIG. 1.

In accordance with the present invention, and as shown particularly on FIG. 6, hub 13 includes first and second substantially semi-cylindrical portions 16 and 17 having the same inner radii $R_1$ and relatively large and small outer radii $R_2$ and $R_3$, respectively, so as to provide the first and second hub portions 16 and 17 with relatively large and small radial thicknesses, respectively. Further, as shown, the tape-securing element 14 which is also molded of plastic resin is in the form of a substantially semi-cylindrical sector which is axially coextensive with hub 13, and which has outer and inner radii $R'_2$ and $R'_3$ substantially equal to the outer radii $R_2$ and $R_3$ of the first and second hub portions 16 and 17, respectively. Thus, in an operative position of tape-securing sector 14 (FIG. 5), sector 14 is closely engageable against the radially outer surface 17_a_ of hub portion 17 and provides, with hub portion 17, a total radial thickness $T_1$ substantially equal to the relatively large radial thickness $T_2$ of the hub portion 16. Further, cooperatively engageable locking means, indicated generally at 18 on FIGS. 4 and 5, are provided on hub 13 and 14 for holding the latter in its operative position (FIG. 5) in which a truly cylindrical surface is constituted by the radially outer surfaces 14_a_ and 16_a_ of sector 14 and hub portion 16, respectively.

In order to define such locking means 18 in the illustrated embodiment of the invention, hub portion 16 of relatively large radial thickness has undercut opposite end portions defining respective recesses 19 opening in the axial direction of hub 13 away from flange 12, and further opening circumferentially toward the other hub portion 17, as at 19_a_ on FIG. 6. Inwardly directed radial shoulders 20 are formed within recesses 19 (FIGS. 4 and 6) adjacent the outer edges or margins of the recess openings 19_a_, and face away from hub portion 17. Further, sector 14 is shown to have extensions 21 which are resiliently flexible by reason of the plastic resin from which sector 14 is molded, and such extensions 21 project tangentially from the opposite ends of sector 14 so as to extend into recesses 19 in the operative position of sector 14 (FIGS. 4 and 5). Extensions 21 are formed with outwardly directed radial shoulders 22 facing toward the adjacent ends of sector 14 so as to be engageable with shoulders 20 in the respective recesses 19 when sector 14 is in its operative position. Each of extensions 21 is formed with an outer end surface 23 (FIG. 6) arranged obliquely in respect to the tangential direction of the respective extension 21 so that, when sector 14 is moved to its operative position, that is, displaced relative to hub 13 in the direction of the arrow 24 on FIG. 6, the oblique surfaces 23 of extensions 21 cam against the outer edges 25 of openings 19_a_ of the respective recesses 19 and cause inward flexing of extensions 21 until shoulders 22 on extensions 21 engage in back of respective shoulders 20 within recesses 19 for securing sector 14 in its operative position against hub portion 17.

In the operative position of sector 14, that is, when shoulders 20 and 22 are interengaged, oblique surface 23 on each extension 21 confronts a similarly obliquely arranged surface 26 within the respective recess 19. Further, the surfaces 23 and 26 of each extension 21 and recess 19 preferably have bevels 23_a_ and 26_a_, respectively, at the ends thereof which are adjacent the axial opening of the recess (FIGS. 4 and 7). Thus, when sector 14 is in its operative position on hub 13, a suitable tool, for example, the blade of a screw driver 27 (FIG. 7), can be forced axially against bevels 23_a_ and 26_a_ and thence between confronting surfaces 23 and 26 so as to spread apart such surfaces and thereby flex the respective resilient extension 21 in the radially inward direction for releasing its shoulder 22 from shoulder 20 and thereby permitting withdrawal of extension 21 from the respective recess 19. By reason of the described oblique arrangement of surfaces 23 and 26 in respect to the tangential direction of the respective extension 21, the spreading apart of the confronting surfaces 23 and 26 by the blade of screw driver 27 engaged therebetween produces a force vector in the tangential direction of the respective extension 21 for removing the latter from recess 19 and thereby displacing sector 14 from its operative position.

Flange member 15 has a central circular aperture 28 (FIGS. 1 and 3) and a rim 29 (FIG. 3) projecting axially from flange member 15 along aperture 28 and being diametrically dimensioned to engage within hub portions 16 and 17 at the end of hub 13 remote from flange 12. Adhesive or cement may be applied between rim 29 and the adjacent surface or surfaces of hub 13 for securing flange member 15 on the hub. Further, diametrically opposed access apertures 30 are formed in flange member 15 so as to register with the axial openings of recesses 19 and thereby expose the locking means or elements 18 for release by a suitable tool, for example, by the screw driver 27 referred to above in connection with FIG. 7.

As shown particularly on FIG. 3, in the illustrated embodiment, the hub 13 of spool member 11 has a wall 31 extending thereacross for defining a mounting socket 32 within hub 13 which opens axially at the end of the hub adjacent flange 12. The socket 32 may be formed with longitudinal splines or projections 33 (FIGS. 2 and 3) by which reel 10 may be rotatably coupled with a reel drive shaft 34 (shown in broken lines on FIG. 3) when such reel drive shaft, which may be part of a recording and/or reproducing apparatus, is inserted in socket 32. Further, wall 31 extending across hub 13 preferably has a central portion 31*a* which is axially raised relative to the remainder of the wall and which projects beyond the end of hub 13 remote from flange 12 so as to extend into the central aperture 28 of flange member 15 (FIG. 3). The axially raised portion 31*a* of wall 31 has a central recess 35 in the surface thereof facing axially away from mounting socket 32, and a thrust ball bearing 36 is pressed into recess 35.

When reel 10 is contained in a casing or housing 37 of a cassette 38 indicated in broken lines on FIG. 3, a leaf spring 39 is suitably mounted within casing 37 bears against thrust ball bearing 36 for yieldably urging reel 10 axially against the bottom wall of casing 37. Such bottom wall of casing 37 has an opening 40 registering with socket 32 and through which reel drive shaft 34 can extend for engagement in socket 32. Further, an axially opening circular groove 41 (FIGS. 2 and 3) may be formed in the end face of hub 13 adjacent flange 12 for slidably receiving an upwardly directed rim 42 formed along the periphery of casing opening 40. Thus, when spring 39 urges reel 10 against the bottom wall of casing 37, the slidable engagement of rim 42 in groove 41 achieves approximate rotational positioning of reel 10 within the cassette casing. However, when reel drive shaft 34 is engaged in socket 32, reel 10 may be lifted by reel drive shaft 34 relative to casing 37 against the force of spring 39 so as to disengage rim 42 from groove 41 and thereby permit reel drive shaft 34 to precisely determine the position of the rotational axis of the reel.

In accordance with the present invention, the thrust ball bearing 36 is preferably formed of a plastic resin so as to avoid the necessity of providing any lubricant at its contact with spring 39. Such lubricant or grease, as would be required if ball bearing 36 was formed of metal, is undesirable in that it may inadvertently be transferred to magnetic tape wound on reel 10 within cassette 38 and thereby adversely affect the characteristics of the magnetic tape. However, when ball bearing 36 is formed of a plastic resin, as is preferred for the above reason, there is the danger that the ball bearing may be fractured or otherwise damaged in the course of being pressed into the respective recess 35. In order to facilitate the removal and replacement of any such plastic ball bearing 36 which is damaged during insertion, or otherwise, the raised central portion 31*a* of wall 31 is formed with a central, relatively small diameter bore 43 (FIGS. 2 and 3) opening from socket 32 into recess 35 and through which a tool, such as, a needle-like or small diameter punch, can act against ball bearing 36 for disloding the latter from recess 35.

As shown particularly on FIG. 2, flange 12 of spool member 11 may have a toothed or serrated periphery, as indicated at 44, which is engageable by a suitable braking element (not shown) provided in cassette casing 37 for preventing rotation of reel 10 when cassette 38 is not in use, and which forms no part of the present invention.

In using the above described reel 10 according to this invention, and starting with sector 14 separated from the remainder of reel 10, an end portion 45 of a magnetic or other tape 46 is extended more or less along surface 17*a* of hub portion 17, for example, as shown is broken lines on FIG. 6, with the longitudinal direction of the tape end portion 45 being precisely determined by the guiding action of flange 12 and flange member 15 on the opposite longitudinal edges along a substantial portion of the length of the tape. With tape end portion 45 being thus positioned, sector 14 is moved to its operative position at which the locking means or elements 18 are interengaged, as previously described, with the result that tape end portion 45 is clamped in at least one of the engaged locking means 18 and also between at least a substantial portion of the inner surface of sector 14 and the outer surface 17*a* of hub portion 17. Of course, if the tape end portion 45 is initially disposed as shown in FIG. 6 so as to extend across the openings 19*a* of both recesses 19, then, in the operative position of sector 14, such tape end portion will be clamped in both of the engaged locking means 18 and also between the entire inner surface of sector 14 and the entire outer surface 17*a* of hub portion 17 for extremely secure attachment of tape 46 to the hub of reel 10.

However, even if tape end portion 45 is clamped in only one of engaged locking means 18 and between only a portion of the inner surface of sector 14 and a corresponding portion of the outer surface 17*a* of hub portion 17, the attachment of tape 46 to reel 10 is sufficiently secure. Thus, in the mass production of tape reels according to this invention, and more particularly in the attachment of tape end portions to such reels, the extent to which each tape end portion 45 extends around hub portion 17 need not be precisely predetermined.

Furthermore, even if sector 14 is not properly mounted on hub 13 or if tape end portion 45 is not properly engaged between sector 14 and hub portion 17, sector 14 can be easily removed or separated from hub 13, for example, by the use of the screw driver 27 as previously described, whereupon tape end portion 45 can be properly resecured to the reel.

Since the tape-securing section 14 is semi-cylindrical, and thus is of relatively large size, such sector 14 can be easily handled during the attachment of tape end portion 45 to reel 10. By reason of the semi-cylindrical configuration of tape-securing sector 14, the latter has inherent resilient flexibility in the diametrical direction between its extensions 21 which facilitates the movement thereof to and from its operative position and also the engagement and disengagement of the locking means 18. However, when sector 14 is in its operative position, and hence is firmly engaged against hub portion 17, such hub portion 17 affords additional rigidity to sector 14 for ensuring that the cylindrical surface constituted by the radially outer surfaces 14*a* and 16*a* of sector 14 and hub portion 16 will retain its desired circular configuration.

Since hub portions 16 and 17 are formed integrally with each other and with flange 12 of spool member 11, the relatively thin hub portion 17 will not be deformed or distorted by the pressure of sector 14 thereagainst when the radially outer surface 17$a$ of hub portion 17 acts as a guide for the semi-cylindrical sector 14 in the operative position of the latter. Thus, the hub surface constituted by surfaces 14$a$ and 16$a$ of sector 14 and hub portion 16 will remain truly cylindrical even after long usage of reel 10, so that the turns of tape 46, when wound on reel 10 will be precisely circular for ensuring the desired dynamic balance of the reel with the tape wound thereon.

Since the total thickness $T_1$ of sector 14, in its operative position, and of hub portion 17 is equal to the thickness $T_2$ of hub portion 16, it will be apparent that the assembly of hub 13 and sector 14 is of uniform thickness along its entire circumference, for further ensuring that the reel 10 according to this invention will be dynamically blanaced in rotation with the result that so-called wow or flutter will not occur in signals recorded or reproduced on tape 46.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention, as defined in the appended claims.

What is claimed is:

1. A tape reel comprising:

a molded plastic resin spool member including a generally circular flange, and a generally cylindrical hub extending axially from said flange concentric with the latter, said hub including first and second substantially semi-cylindrical portions having the same inner radii and relatively large and small outer radii, respectively, so as to provide said first and second portions with relatively large and small radial thicknesses, respectively; a substantially semi-cylindrical sector of molded plastic resin having outer and inner radii substantially equal to said outer radii of said first and second portions, respectively, of the hub so that, in an operative position of said sector, the latter is closely engageable against the radially outer surface of said second hub portion for securing a tape end portion therebetween and to provide, with said second hub portion, a total radial thickness substantially equal to said relatively large radial thickness of said first hub portion; and cooperatively engageable locking means on said hub and sector for holding the latter in said operative position thereof and thereby permitting the smooth winding of a secured tape on a cylindrical surface constituted by the radially outer surfaces of said first hub portion and said sector, respectively.

2. A tape reel according to claim 1; further comprising a generally circular flange member, and means for securing said flange member at the end of said hub remote from said flange of said spool member so that a tape wound on said cylindrical surface is guided between said flange and flange member.

3. A tape reel according to claim 2; in which said means for securing said flange member includes a circular rim projecting axially from said flange member concentrically with the latter and diametrically dimensioned to engage within said first and second hub portions at said end of the hub.

4. A tape reel according to claim 2; in which said locking means are releasable from each other for removal of said sector from said operative position, and said flange member has access apertures therein through which said locking means are adapted to be released.

5. A tape reel according to claim 1; in which said first hub portion has undercut opposite end portions defining respective recesses opening circumferentially toward said second hub portion, said recesses have shoulders therein facing away from said second hub portion and defining said locking means on the hub, and said locking means on said sector includes resilient extensions projecting tangentially from the opposite ends of said sector into said recesses in said operative position of the sector and having shoulders engageable with said shoulders in the respective recesses.

6. A tape reel according to claim 5; in which said recesses have openings in the axial direction of said hub away from said flange of the spool member so that a tool may be inserted through said opening of each of said recesses for flexing the respective resilient extension of said sector in the direction to release said shoulders of the respective recess and extension from each other and thereby permit removal of said sector from its operative position.

7. A tape reel according to claim 6; in which each said recess and extension have surfaces which confront each other in said operative position of the sector and which have bevels adjacent said opening of the respective recess for facilitating said flexing of the respective resilient extension by a tool engaged between said bevels of the confronting surfaces for spreading apart the latter.

8. A tape reel according to claim 7; in which said confronting surfaces of each said recess and extension are arranged obliquely in respect to the tangential direction of the respective extension so that said spreading apart of the confronting surfaces by a tool engaged therebetween produces a force vector in said tangential direction for removing said sector from its operative position.

9. A tape reel according to claim 6; further comprising a generally circular flange member, and means for securing said flange member at the end of said hub remote from said flange of said spool member so that a tape wound on said cylindrical surface is guided between said flange of the spool member and said flange member; and in which said flange member has access apertures therein registering with said openings of the recesses and through which a tool can be inserted in said openings.

10. A tape reel according to claim 1; in which said hub of the spool member has a wall extending thereacross for defining a mounting socket of the reel opening axially at the end of the hub adjacent said flange, said wall has a central recess in the surface thereof facing axially away from said mounting socket, a thrust ball bearing is disposed in said recess with a press fit therebetween, and said wall has a central, relatively small diameter bore opening from said socket into said recess and through which a tool can act against said ball bearing for dislodging the latter from said recess when the ball bearing is damaged and requires replacement.

11. A tape reel according to claim 10, in which said thrust ball bearing is formed of a plastic resin.

12. A tape reel according to claim 10; in which said wall has a central portion which is axially raised relative to the remainder of said wall and which projects beyond the end of the hub remote from said flange; and further comprising a generally circular flange member secured at said end of the hub remote from said flange of the spool member, said flange member having a central aperture into which said raised central portion of said wall projects.

* * * * *